(12) United States Patent
Akemakou

(10) Patent No.: US 6,242,834 B1
(45) Date of Patent: Jun. 5, 2001

(54) BRUSHLESS POLYPHASE MACHINE, IN PARTICULAR MOTOR VEHICLE ALTERNATOR

(75) Inventor: Dokou Antoine Akemakou, Vitry sur Seine (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 09/202,339
(22) PCT Filed: Apr. 8, 1998
(86) PCT No.: PCT/FR98/00727
 § 371 Date: Dec. 14, 1998
 § 102(e) Date: Dec. 14, 1998
(87) PCT Pub. No.: WO98/47216
 PCT Pub. Date: Oct. 22, 1998

(30) Foreign Application Priority Data

Apr. 14, 1997 (FR) .................................................. 97 04534

(51) Int. Cl.[7] ............................ H02K 21/00; H02K 21/38
(52) U.S. Cl. ........................ 310/162; 310/181; 310/171; 310/168; 310/184
(58) Field of Search ................................... 310/181, 168, 310/162, 171, 179, 184, 185, 154, 254

(56) References Cited

U.S. PATENT DOCUMENTS 3,452,229 * 6/1969 Pimlott et al. ....................... 310/168
4,038,575 * 7/1977 Nordebo ............................... 310/179
5,051,640 * 9/1991 Freise .................................... 310/162
5,672,925 * 9/1997 Lipo et al. ............................ 310/154
5,825,113 * 10/1998 Lipo et al. ........................... 310/181

FOREIGN PATENT DOCUMENTS 30 09 279 10/1981 (DE) .
0 707 374 4/1996 (EP) .

OTHER PUBLICATIONS

Zhi–Gang: "A Novel Electromagnetic Spiral linear Step Motor"; Conference Record of the Industry Applications Conference, vol. 1, Oct. 2–5 1994, Denver, CO, US pp. 329–336.
Patent Abstracts of Japan vol. 9, No. 266 (E–352), Oct. 23, 1985 & JP 60 113649 A (Hitachi Kinzoku), Jun. 20, 1985.

* cited by examiner

Primary Examiner—Karl Tamai
(74) Attorney, Agent, or Firm—Morgan & Finnegan LL (57) ABSTRACT

A flux concerning electrical machine has a stator and a rotor, the stator including on its face a series of notches housing a series of stator coils, and further including a series of housings for excitation means, and the rotor including a plurality of flux commutator teeth for selectively making pairs of closed magnetic circuits through the stator coils. In accordance with invention the stator includes a plurality of independent stator coils defining as many phases and located in a series of individual cells angularly distributed on its circumference and the rotor teeth are equi-angularly spaced so that the angular positions of the various pairs of teeth have predetermined phases relative to the various individual cells. The invention is applicable in particular to brushless alternators for motor vehicles.

31 Claims, 7 Drawing Sheets

FIG_1

FIG_6

FIG_7

FIG_8

FIG_9

FIG_10

FIG_11

BRUSHLESS POLYPHASE MACHINE, IN PARTICULAR MOTOR VEHICLE ALTERNATOR

BACKGROUND OF THE INVENTION

The present invention is generally concerned with rotating machines such as motor vehicle alternators.

A conventional motor vehicle alternator is a polyphase generator generally including a stator within which turns a rotor provided with an excitation coil. The coil is energised via brushes in contact with two collector rings on a projecting part of the rotor shaft.

Using brushes has disadvantages, including the need for a relatively great axial length of the alternator, a set of brushes and collectors that increase the unit cost and malfunctions due to faulty contact between the brushes and the collector rings, in particular as a result of wear.

There exist in the prior art certain proposals aimed at providing rotating machines that can be used as motor vehicle alternators that have no brushes.

In one prior art alternator the claws of the two pole wheels of the rotor, which normally interpenetrate, are truncated to provide space in a transverse plane for a support for a fixed excitation coil disposed inside the pole wheels. However, this approach is detrimental to the efficiency of the machine, because the areas of the air gap are then very significantly reduced. What is more, for a given output/speed curve, a machine of the above type is significantly heavier than a conventional machine, which is particularly disadvantageous in the case of vehicle alternators.

In another prior art alternator two pole wheels with interleaved claws are mounted cantilever fashion at one axial end of the machine between an internal fixed excitation coil and external stator coils.

This prior art solution also has disadvantages, in particular the fact that the axial dimension and the weight of the machine are necessarily increased. Also, the enlarged air gaps in the rotor reduce the efficiency of the machine.

What is more, in both cases referred to above, the design of the machine makes it essential to take into account electromagnetic phenomena not only in the plane perpendicular to the rotation axis, i.e. in two dimensions, but also in the direction of the axis, i.e. in the third spatial dimension.

This necessity for three-dimensional design of the machine makes it extremely difficult and time-consuming to model and to optimise the various parameters.

A flux commutating machine with no brushes, known in particular from document EP-0 707 374, has the advantage of being easily modelled and optimised in two dimensions only.

This prior art machine nevertheless has the drawback of being restricted to single-phase operation, although three-phase machines can be desirable in a large number of applications, in particular in terms of electromagnetic efficiency and in terms of the simplicity and economy of the associated rectifier and smoothing means.

BRIEF SUMMARY OF THE INVENTION

The Applicant has found that it is possible to use the flux commutation technique to produce various polyphase machines with great flexibility while retaining two-dimensional design and two-dimensional optimisation.

Accordingly, the present invention proposes a flux commutating electrical machine including a stator and a rotor, the stator having on its inside face a series of notches housing a series of stator coils and further including a series of housings for excitation means and a rotor including a plurality of flux commutator teeth adapted selectively to establish pairs of closed magnetic circuits through the stator coils, characterised in that the stator includes a plurality of independent stator coils defining the same number of phases and situated in a series of individual cells angularly distributed around its circumference and in that the teeth of the rotor are equi-angularly spaced so that the angular positions of the various pairs of teeth have predetermined phases relative to the various individual cells.

Preferred but non-limiting aspects of the machine in accordance with the invention are as follows:

each individual cell has a stator structure defining a pair of spaced notches for two portions of a stator coil, said notches being delimited laterally by two stator teeth, and excitation means adapted to establish in one or other of the stator teeth within said stator coil a magnetic field varying in accordance with the mutual angular position of the rotor teeth and the stator teeth;

the individual cells are separated from each other by gaps;

the individual cells are separated from each other by decoupling permanent magnets the field orientation of which is opposite to that of the excitation means;

the excitation means of each cell include a permanent magnet disposed between two stator elements having a generally U-shaped profile defining said notches and said stator teeth;

the excitation means of each cell include an excitation coil disposed in two notches of a single stator element one of which is substantially half-way between two stator coil notches also formed in said stator element;

the excitation coil is disposed in two notches in the inside surface and in the outside surface of the stator element to generate an essentially tangential magnetic field at said coil;

the excitation coil is disposed in two notches both in the inside surface of the stator element to generate an essentially radial magnetic field at said coil;

the various excitation coils are connected in parallel to the same source of current;

the machine comprises pairs of cells formed in a common structural element housing two stator coils corresponding to two different phases, a magnet for exciting one of the stator coils and an excitation coil for exciting the other stator coil;

the stator coils are angularly equidistant over all of the inside circumference of the stator, the angular gap between the various cells being substantially equal to the angular dimension of a notch receiving one run of a stator coil;

the portions of the stator coils in the same cell or the same group of cells are separated by a constant angular gap and the angular gap between portions of successive stator coils in two separate cells or groups of cells is different from said constant angular gap;

said constant angular gap is identical to the angular gap between two adjacent rotor teeth;

the geometry of the rotor and stator structures of the machine satisfies the following condition:

$$N_{M.q.}[(N_C+1).\Delta\theta_R+(m/q).\Delta\theta_R]=k.\Delta\theta_R=2\pi$$

where $N_M$ is the number of individual machines on the circumference of the stator, q is the number of phases of each individual machine, Nc is the number of excitation means, such as magnets, per phase of each individual machine, m is a positive or negative integer representing the value of the phase difference between two individual machines and is in the range −(q−1) to +(q−1), $\Delta\theta_R$ is the constant angular gap between two adjacent rotor teeth, or rotor pitch, $\Delta\theta_S$ is the constant angular gap between two adjacent runs of stator coils, or stator pitch, and k is an integer;

the rotor pitch and the stator pitch satisfy the following condition:

$$(7/8).\Delta\theta_S \leq \Delta\theta_R \leq (5/4).\Delta\theta_S$$

the stator pitch is equal to the rotor pitch and in that the geometry of the rotor and stator structures of the machine satisfies the following condition:

$$N_m.q.(N_c+1)+N_M.m=k$$

the machine comprises a single individual machine with three regularly distributed individual cells respectively accommodating the stator coils of three phases and the rotor includes a number of rotor teeth equal to 4, 5, 7 or 8 and preferably equal to 5;

the machine comprises two individual machines each with three regularly distributed individual cells respectively accommodating the stator coils of three phases and the rotor includes a number of rotor teeth equal to 8, 10, 14 or 16 and preferably equal to 10;

the machine comprises a single stator frame including at least two series of internal notches adapted to accommodate respectively the stator coils and the excitation magnets or the excitation coils.

As indicated above, a rotating machine in accordance with the invention is advantageously used as a brushless alternator for motor vehicles.

BRIEF DESCRIPTION OF THE DRAWINGS

Other aspects, aims and advantages of the present invention will become more apparent on reading the following detailed description of preferred embodiments of the invention given by way of example and with reference to the accompanying drawings, in which.

Note that the following description is given with reference to a generator mode of operation. The skilled person will obviously realise on reading the description how such machines can operate as motors.

Note also that as far as possible components or parts that are identical or similar in different figures are designated by the same reference symbols.

DETAILED DESCRIPTION OF INVENTION

Figure 1:
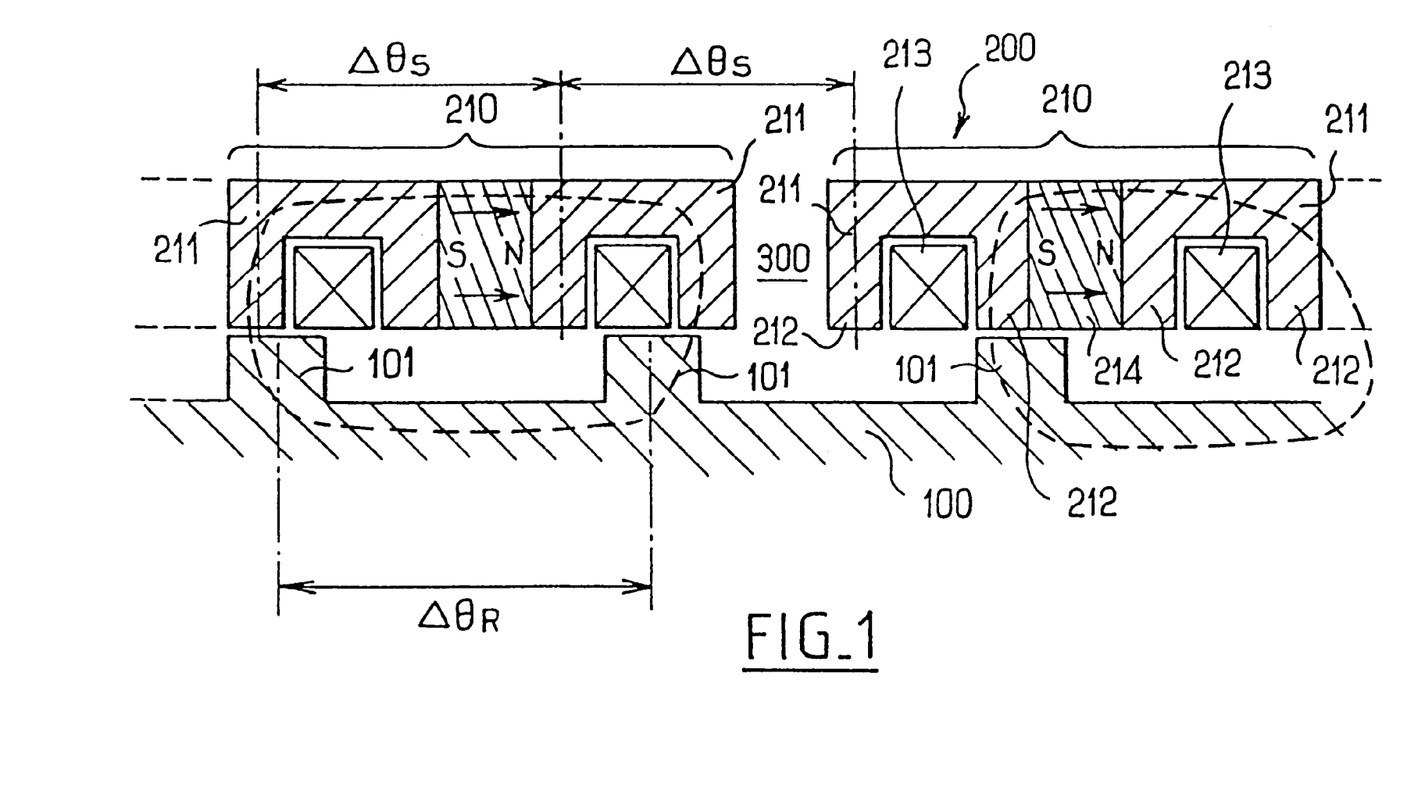
FIG. 1 is a diagrammatic linear representation of the rotor and stator structure of a rotating machine in accordance with the present invention.

Referring first of all to FIG. 1, for explanatory purposes part of a stator and part of a rotor of a flux commutating electrical machine in accordance with the invention are represented in a linear fashion.

The rotor 100 has along an edge a plurality of rotor teeth 101 which are preferably regularly spaced at a pitch $\Delta\theta_R$.

The stator 200 comprises a plurality of cells 210 each including two preferably identical stator elements 211 with a U-shaped profile defining on the side facing towards the rotor a notch receiving a stator coil 213. Accordingly each element 211 defines two teeth 212 on respective opposite sides of the notch. An excitation permanent magnet 214 is placed between the two elements 211 with its N/S orientation directed from one stator element 211 to its neighbour, as shown here. Each cell 210 is separated from the adjoining cell by a gap 300, the width of which is preferably equal to that of the magnets 214. In this case, the pitch $\Delta\theta_S$ of the various stator elements 211 is constant.

As described in particular in document EP-A-0 707 374, a necessary condition for a machine equipped with a rotor and a stator as described above is that the pitch $\Delta\theta_R$ is close to the pitch $\Delta\theta_S$.

In this case, when they are in line with two stator teeth 212 delimiting both an excitation magnet 214 and a stator coil 213, the pairs of rotor teeth 101 apply a maximal excitation magnetic flux to the stator coil. Rotation of the rotor therefore generates an alternating current in the coil.

The idea on which the present invention is based is to design the geometry of the rotor and of the stator so that the positions of pairs of teeth of the rotor relative to the stator elements is different from one cell to another, which is achieved by appropriate choice of the value of $\Delta\theta_R$ for a given value $\Delta\theta_S$.

In particular, if a three-phase machine is required, i.e. a machine having three independent stator coils in three stator cells 210, it can be shown that the following equation must be satisfied:

$$2.\Delta\theta_S=2.\Delta\theta_R+(m/3).\Delta\theta_R \quad (1)$$

with m∈{−2,−1,1,2}.

In the remainder of the description m=−1.

Given the above hypothesis, i.e. the use of three cells 210 each including two elements 211, in other words six elements 211 regularly distributed around the circumference of a circular stator:

$$\Delta\theta_S=2\pi/6=\pi/3$$

Equation (1) above therefore gives:

$$\Delta\theta_R=2\pi/5$$

Thus by choosing a rotor with five equi-angularly spaced teeth 101 at its periphery a three-phase flux commutating rotating machine is obtained.

The values m=−2, m=1 and m=2 would respectively yield a rotor with 4, 7 and 8 teeth 101.

Clearly the above reasoning can easily be applied to any number of phases.

Figure 2:
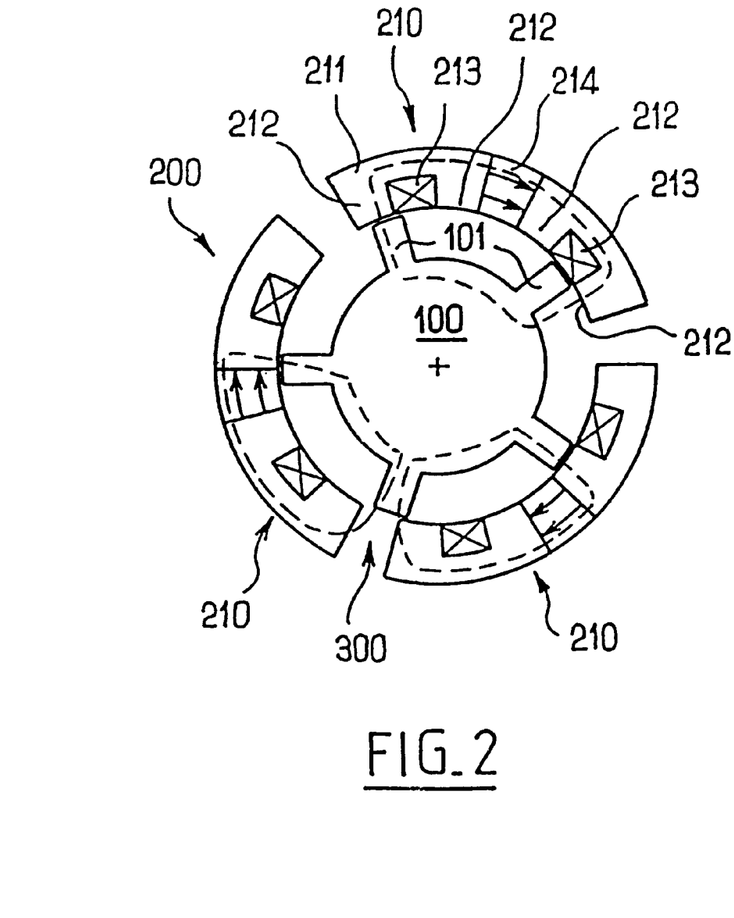
FIGS. 2 through 9 are diagrammatic cross-sectional views of eight embodiments of the rotor and stator structure of a rotating machine in accordance with the present invention.

FIG. 2 is a schematic representation of the machine obtained as described above.

This figure shows that, because of the necessary differences between the values of $\Delta\theta_R$ and $\Delta\theta_S$, the alignments between the rotor teeth 101 and the stator teeth 212 adjoining the notches are never optimal. The resulting flux losses are largely acceptable, however.

The above approach can naturally be applied to a stator including a number of cells 210 equal to an integer multiple of the number of phases.

For example, if the stator 200 has six cells 210, the above calculation yields a rotor having ten equiangularly distributed rotor teeth 101.

Figure 3:
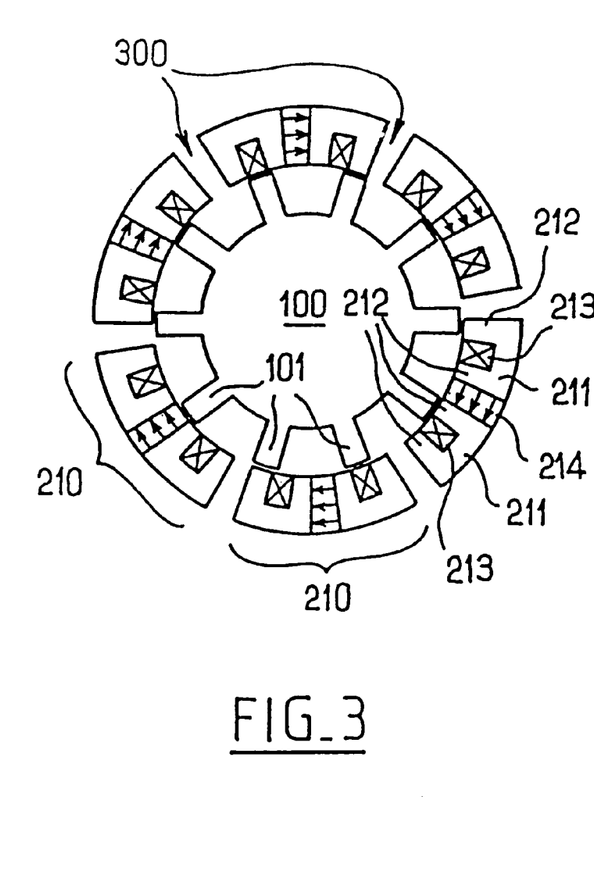

FIG. 3 shows this embodiment. In this case the stator coils of the three phases are arranged sequentially: phase 1, phase 2, phase 3, phase 1, phase 2, phase 3; in this specific example the two coils for the same phase are therefore in two diametrically opposite cells 210.

Depending on whether the output voltage or the current is to be emphasized, the two stator coils 213 of the same phase are connected either in series or in parallel.

Figure 4:
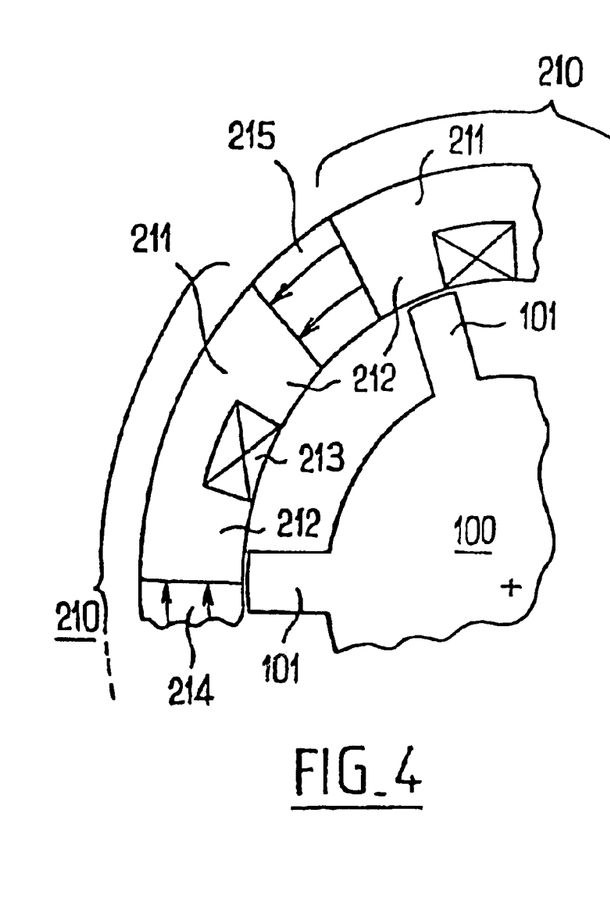

FIG. 4 shows a variant of the rotor and stator structure from FIG. 2 in which additional permanent magnets 215 are inserted into the gaps 300 between pairs of stator cells 210.

The magnets 215 have the opposite N/S orientation to the excitation magnets 214, as shown.

The magnets 215 reinforce the excitation flux and improve the decoupling between the various phases in that they provide obstacles to the exit of the flux lines at the angular limits of each cell.

Figure 5:
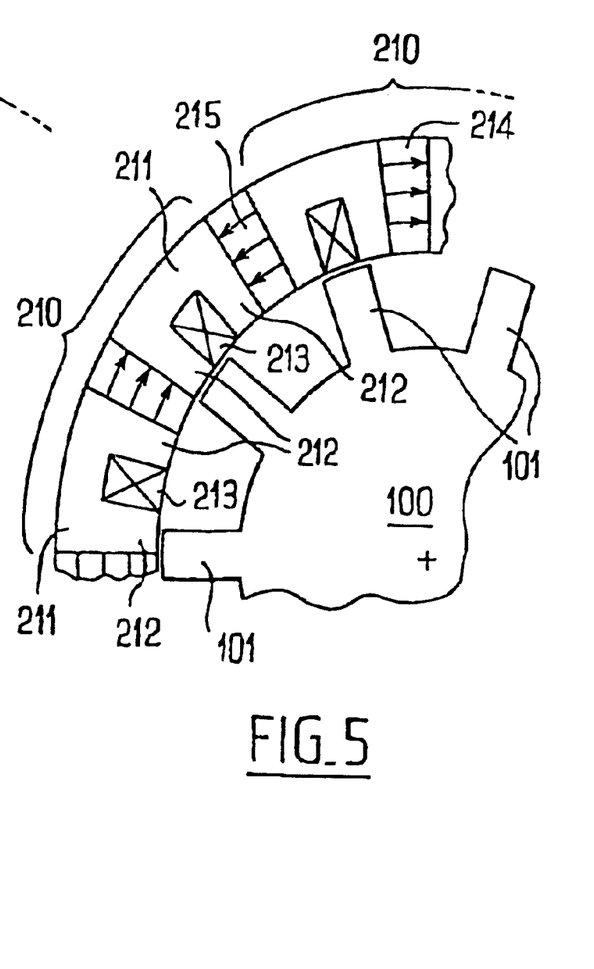

FIG. 5 shows the same variant but applied to the rotor and stator structure shown in FIG. 3.

Excitation using permanent magnets as shown in FIGS. 2 to 5 can be replaced by excitation using coils.

Figure 6:
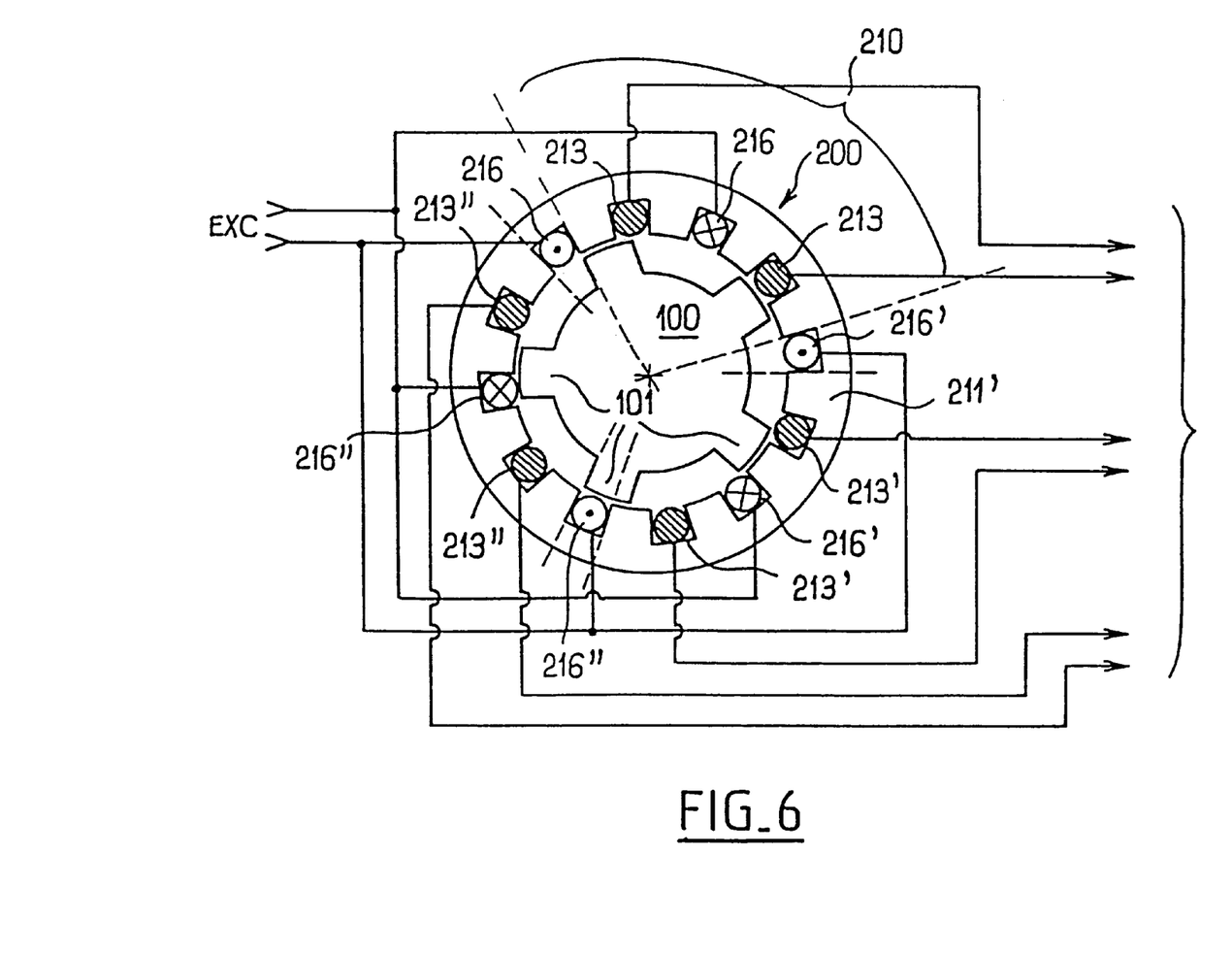

Thus FIG. 6 shows a three-phase structure with three stator cells 210 and five rotor teeth, analogous to FIG. 2, in which excitation is provided by coils interleaved radially and circumferentially with the stator coils.

Three stator coils 213, 213' and 213" are shown, corresponding to the three phases, with three excitation coils 216, 216' and 216" wound in the directions indicated. The three stator coils and the three excitation coils are preferably formed in twelve regularly spaced notches on the inside face of a single stator frame 211'.

Each cell or phase 210 is delimited as indicated in chain-dotted line.

In the above type of embodiment each excitation coil 216 produces an essentially radial magnetic flux that flows in one of the two stator teeth 212 that it circumscribes as soon as the latter tooth is in magnetic contact with one of the teeth 101 of the rotor and the phenomenon observed is similar to that obtained with excitation by permanent magnets.

To have an excitation voltage that is as high as possible when the machine is connected to an onboard network of a motor vehicle, the three excitation coils 216, 216' and 216" are advantageously connected in parallel to the terminals of an excitation input EXC, as shown.

Figure 7:
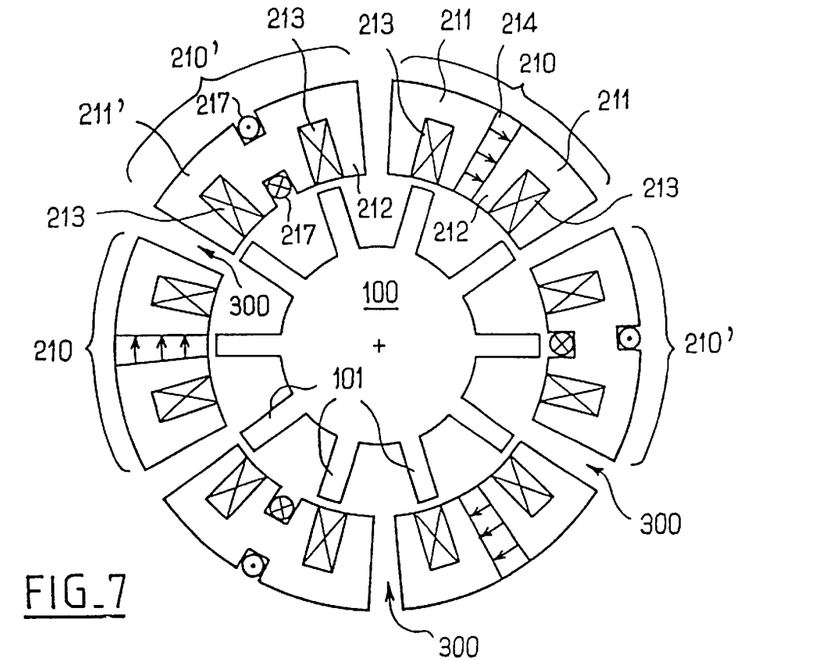

FIG. 7 shows a rotor and stator structure with six cells 210 separated by gaps 300 in a manner analogous to FIG. 3. In this case the machine is of the mixed excitation type, however. Three first cells 210 therefore have an excitation magnet 214 between two adjacent U-shaped stator elements 211. The other three cells 210' each have a single rotor frame element 211' defining two internal notches for the stator coil 213 and, halfway between the notches in the circumferential direction, an excitation coil 217 in an axial-radial plane received in two other notches respectively formed in the inside face and the outside face of the frame part 211'.

For balanced electrical behaviour when the rotor is rotating, the cells 210 and 210' are preferably disposed in an alternating fashion. Accordingly each phase has a cell 210 excited by magnets and a cell 210' excited by coils.

Figure 8:
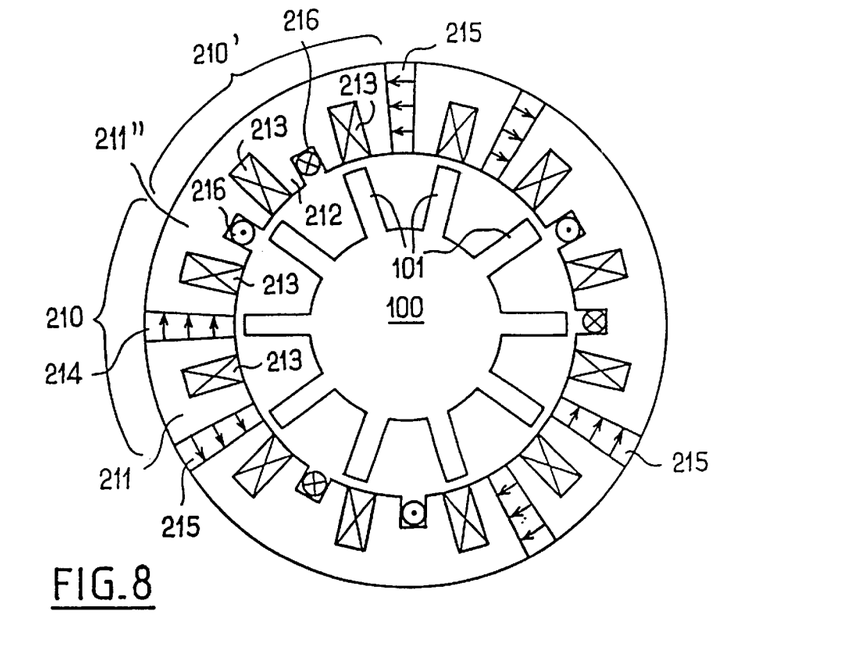

FIG. 8 shows an embodiment that differs from the one from FIG. 7 in three respects:

first, two adjacent cells 210, 210' are grouped together on the same frame element 211';

secondly, the cells 210' excited by coils no longer have a coil lying in an axial-radial plane but a coil 216 analogous to that from FIG. 6, i.e. in a tangential plane; note that in this regard each coil has a run extending inside the phase winding 213 concerned and a run extending between the two phase windings of the same group of two cells;

thirdly, the frame members 211" are separated by inverse decoupling and flux reinforcing magnets 215, in a similar manner to what is shown in FIGS. 4 and 5.

Note that in all the preceding embodiments the rotor pitch $\Delta\theta_R$, i.e. the angular distance between two rotor teeth 101, is not equal to the stator pitch $\Delta\theta_S$, i.e. the angular difference between two homologous stator teeth 212 or two adjacent stator members 210.

Figure 9:
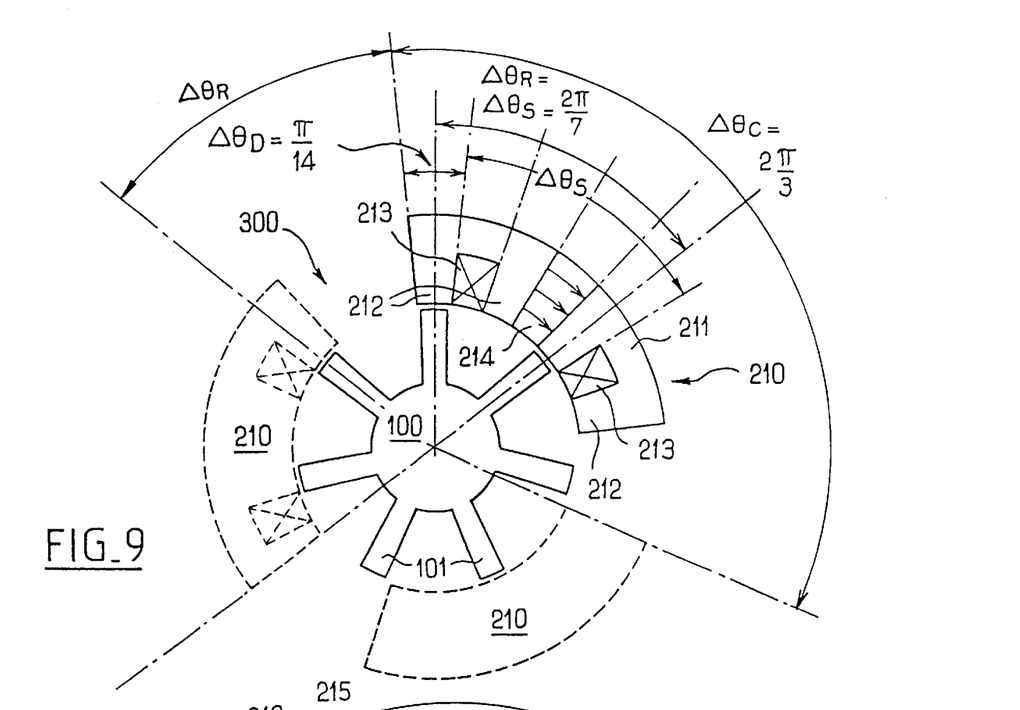

An embodiment will now be described with reference to FIG. 9 which, whilst retaining the polyphase, and in particular three-phase, nature of the machine, provides for equal rotor and stator pitches $\Delta\theta_R$ and $\Delta\theta_S$, respectively. In FIG. 9, portions of the stator coils in the same cell 210 are separated by a constant angular gap ($\Delta\theta_S$) and the angular gap between successive stator coils is not equal to the constant angular gap ($\Delta\theta_S$).

In this particular example a rotor 100 has seven teeth spaced by a rotor pitch $\Delta\theta_R$ equal to $2\pi/7$.

Three stator cells 210 are provided, each including, as in FIG. 2, two stator elements 211 receiving a stator winding 213 between two teeth 212 and separated by an excitation permanent magnet 214. The stator pitch $\Delta\theta_S$ in each cell is also equal to $2\pi/7$, as indicated hereinabove.

To assure an electric phase difference of $2\pi/3$ between the first and second cells 210 it is therefore necessary and sufficient for the angular offset $\Delta\theta_C$ between the two cells to be equal to:

$$2\pi/7 + 2\pi/7 + (1/3).2\pi/7 = 2\pi/3$$

which produces three cells 210 regularly spaced at $2\pi/3$.

What is more, the teeth 212 preferably have the same angular dimension $\Delta\theta_D$ as the notches for the stator windings 213 and the excitation magnets 214. In this specific case, this angular dimension is $(2\pi/7)/4$, that is to say $$\Delta\theta_D = \pi/14.$$

In the above case, to optimise the coupling between the rotor teeth 101 and the stator teeth 212, said rotor teeth 101 also have an angular dimension of $\pi/14$.

The angular dimension of the gaps 300 between the adjoining cells 210 is in this case equal to:

$$2\pi/3 - (7.\pi/14) = \pi/6$$

Figure 10:
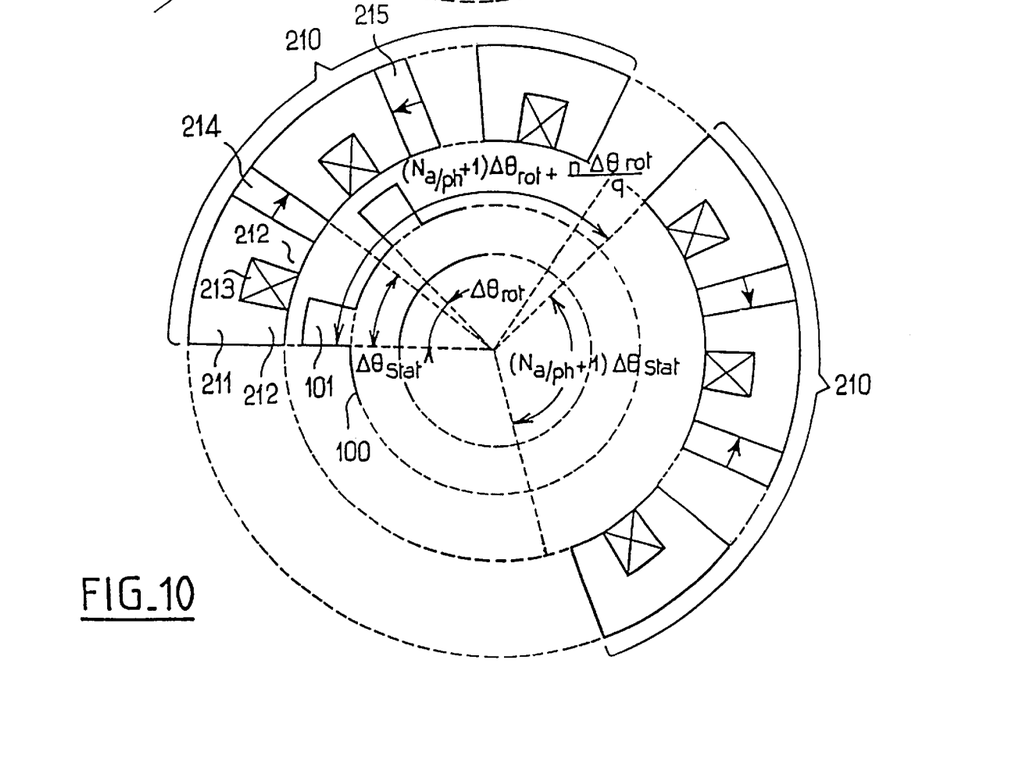
FIG. 10 is a diagrammatic view in cross-section showing one possible generalisation of the rotor and stator structure of a machine in accordance with the invention.

How to generalise the present invention to a polyphase machine having any number of cells per phase will now be explained with reference to FIG. 10.

The following notation will be used:

$N_M$: the number of individual machines on the stator circumference q: the number of phases of each individual machine $N_c$: the number of excitation means, such as magnets, per phase of each individual machine m: an integer representing the value of the phase shift between two individual machines.

In the present example, this phase comprises a set of $N_c+1$ "U"-shape stator elements 211 separated from each other by $N_c$ magnets.

To determine the angular offset of the successive phases each phase is deemed to occupy an angular range equal to $(N_c+1).\Delta\theta_S$, incorporating a fictitious $(N_c+1)$th magnet 214' shown in chain-dotted line in the figures.

The successive phases having to be spaced by $(m/q).\Delta\theta_R$ by definition, a machine with q phases will therefore occupy an angular range equal to $$q.[(N_c+1).\Delta\theta_R+((m/q).\Delta\theta_R]$$

A machine with $N_M$ individual machines will therefore occupy on the circumference of the stator a range equal to $$N_{M.q.[(Nc+1)}.\Delta\theta_R+(m/q).\Delta\theta_R]=2\pi \quad (2)$$

With the hypothesis of a stator with regularly distributed stator elements 211:

$$k.\Delta\theta_S=2\pi \quad (3)$$

where k is an integer.

The number k is necessarily greater than 6 assuming a polyphase machine with a plurality of individual machines.

To assure proper commutation of the flux by the teeth 101 of the rotor, $\Delta\theta_R$ and $\Delta\theta_S$ are preferably chosen to be as close together as possible, and a condition of the following type is preferably chosen:

$$(7/8).\Delta\theta_S \leq (5/4).\Delta\theta_S$$

Finally, note that a positive sign is preferably applied to the value of m, knowing that a negative sign could lead to untimely overlapping of two successive phases or to insufficient decoupling due to an excessively high proximity between phases.

The optimum machines obtained from the above developments will now be briefly described, respectively in the case of a two-phase machine and in the case of a three-phase machine, taking as hypothesis $\Delta\theta_S=\Delta\theta_R$. In this case the number k obtained is the number of teeth 101 on the rotor.

In the case of a two-phase machine (q=2 and m=±1), from equations (2) and (3):

$$k=2N_M.[(N_c+1)\pm1/2]$$

For example:

for m=+1, $N_M=2$ and $N_c=1$ $$k=4.[(1+1)+1/2]=10$$

for m=+1, $N_M=2$ and $N_c=2$ $$k=4.[(2+1)+1/2]=14$$

for m=-1, $N_M=2$ and $N_c=1$ $$k=4.[(1+1)-1/2]=6$$

for m=-1, $N_M=2$ and $N_c=2$ $$k=4.[(2+1)-1/2]=10$$

For a three-phase motor, q=3 and m∈{-2;-1,1,2}. Adopting the same simplifying hypothesis as previously, i.e. $\Delta\theta_S=\Delta\theta_R$:

$$k=3N_M.[(N_c+1)+m/3]$$

For example:

for m=+1, $N_M=1$ and $N_c=1$ $$k=3.[(1+1)+1/3]=7$$

for m=+1, $N_M=1$ and $N_c=2$ $$k=3.[(2+1)+1/3]=10$$

for m=-1, $N_M=2$ and $N_c=3$ $$k=3.[(3+1)+1/3]=13$$

We have attempted to determine the optimum number of rotor teeth when the following parameters of the machine are imposed:

its outside radius $R_{ext}$;

its air gap radius $R_{ent}$;

it air gap size E.

It can be shown that the optimal number of teeth $k_{opt}$ is obtained from the following formula:

$$K_{opt}=\pi/(4.\sqrt{[(E/R_{ent}).((R_{ext}/R_{ent})-(1+(E/2.R_{ent}))]})$$

Figure 11:
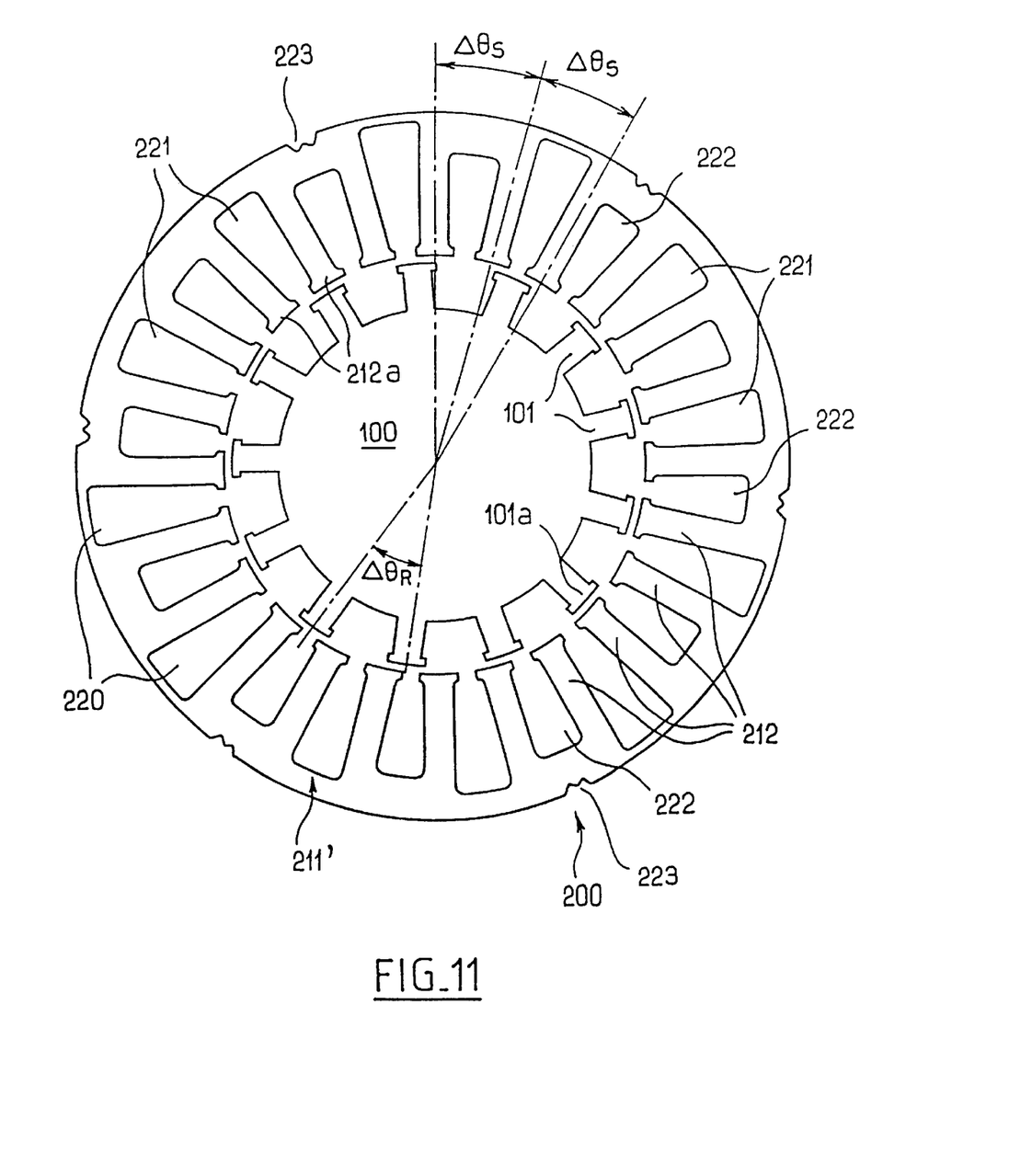
FIG. 11 is a view in cross-section of one concrete embodiment of a rotor and stator structure in accordance with the invention, without the associated coils and magnets.

Finally, FIG. 11 shows one concrete embodiment of the stator structure and of the rotor structure of a rotating machine in accordance with the invention embodying in particular the solution shown in FIG. 8 (machine with excitation by coils and by magnets and also provided with decoupling magnets).

Note that each rotor tooth 101 and each stator tooth 212 has a respective slightly enlarged root 101a and 212a.

Note also that the stator includes a ferromagnetic frame element in which twenty-four notches spaced by 15° are formed. In this case the stator pitch $\Delta\theta_S$ is 30°.

The notches are divided into three groups with different depths depending on whether they receive phase coils, excitation coils or magnets.

To be more precise, the deepest notches 220 receive the excitation magnets 214 and the decoupling magnets 215 (not shown), the intermediate depth notches receive the excitation coils 216 (not shown) and, finally, the shallowest notches 222 receive the phase coils 213 (not shown).

Finally, six recesses 223 are provided on the outside periphery of the stator 211' for welding tags of stacked laminations constituting the frame of the stator, in a manner that is conventional in itself.

The rotor 100 has thirteen teeth 101 regularly spaced in pairs by an angle $\Delta\theta_R$ equal to $2\pi/13$.

Of course the present invention is not limited to the embodiments described and shown and the skilled person will know how to vary or modify them within the spirit of the invention.

What is claimed is:

1. A flux commutating electrical machine comprising:

a stator having an inner circumferential surface defining a plurality of angularly distributed cells and a number of independent stator coils defining the same number of phases, the stator coils being supported by the cells, and excitation means supported by each cell; and a rotor having a plurality of flux commutator teeth facing the stator cell, the teeth being equiangularly spaced such that the position of a pair of rotor teeth relative to an opposing stator cell is different for each stator cell;

wherein portions of stator coils in the same cell or the same group of cells are separated by a constant angular gap ($\Delta\theta_S$) and the angular gap between portions of successive stator coils in two separate cells or groups of cells is different from said constant annular gap.

2. A machine according to claim 1 wherein said constant angular gap ($\Delta\theta_S$) is identical to the angular gap ($\Delta\theta_R$) between two adjacent rotor teeth.

3. An alternator comprising:

a stator having an inner circumferential surface defining a plurality of equiangularly distributed cells, each cell defining at least two notches;

a number of independent stator coils defining the same number of phases, portions of the stator coils being received within respective notches of the cells, wherein one or more cells define an individual machine;

excitation means supported by each cell, between each notch; and a rotor defining a plurality of flux commutator teeth for selectively establishing pairs of closed magnetic circuits through the stator coils, the teeth facing the stator cells, the rotor teeth being equiangularly spaced so that pairs of teeth have angular positions with predetermined phases relative to the individual cells;

wherein the geometry of the rotor and stator structures of the machine satisfies the following condition:

$$N_{M.q.}[(N_c+1).\Delta\theta_R+(m/q).\Delta\theta_R]=k.\Delta\theta_R=2\pi, \text{ where:}$$

$N_M$ is the number of individual machines on the circumference of the stator;

q is the number of phases of each individual machine;

Nc is the number of excitation means per phase of each individual machine;

m is a positive or negative integer representing the value of the phase difference between two individual machines and is in the range $-(q-1)$ to $+(q-1)$;

$\Delta\theta_R$ is the constant angular gap between two adjacent rotor teeth, or rotor pitch;

$\Delta\theta_S$ is the constant angular gap between two adjacent runs of stator coils, or stator pitch; and k is an integer.

4. An alternator according to claim 3 wherein adjacent individual cells are separated by gaps.

5. An alternator according to claim 3 wherein adjacent individual cells are separated from each other by decoupling permanent magnets having a field orientation opposite to that of the excitation means.

6. An alternator according to claim 3 wherein the excitation means of each cell includes a permanent magnet disposed between two stator elements.

7. An alternator according to claim 3 wherein the excitation means of each cell includes an excitation coil disposed between the stator coils.

8. An alternator according to claim 3 wherein the excitation means comprises permanent magnets between certain notches and excitation coils between other notches.

9. A machine according to claim 3 wherein the rotor pitch and the stator pitch satisfy the following condition:

$$(7/8).\Delta\theta_S \leq \Delta\theta_R \leq (5/4).\Delta\theta_S.$$

10. A machine according to claim 9 wherein the stator pitch is equal to the rotor pitch and the geometry of the rotor and stator structures of the machine satisfies the following condition:

$$N_{M.q.(Nc+1)}+N_{N.m=k}.$$

11. A flux commutating electrical machine comprising:

a stator having an inner circumferential surface defining a plurality of angularly distributed cells, the cells defining a plurality of notches;

a number of independent stator coils defining the same number of phases, the stator coils being supported by the notches of the cells such that two notches support portions of a single stator coil;

an excitation coil supported by each cell in two notches, one of which is substantially half-way between the two notches housing the portions of a single stator coil in said cell, such that a portion of the excitation coil is radially and circumferentially substantially between the portions of the single stator coil; and a rotor having a plurality of flux commutator teeth facing the stator cell, the teeth being equiangularly spaced such that the position of a pair of stator rotor teeth relative to an opposing stator cell is different for each stator cell.

12. A flux commutating electrical machine comprising a stator and a rotor, the stator having an inside face defining a series of notches housing a series of stator coils and further including a series of housings for excitation means, the rotor including a plurality of flux commutator teeth adapted selectively to establish pairs of closed magnetic circuits through the stator coils, the series of stator coils comprising a plurality of independent stator coils defining the same number of phases and situated in a series of individual cells angularly distributed around the inside face of the stator, wherein one or more cells define an individual machine, and the teeth of the rotor being equiangularly spaced so that angular positions of various pairs of teeth have predetermined phases relative to the various individual cells;

wherein the geometry of the rotor and stator structures of the machine satisfies the following condition:

$$N_M.q.[(N_c+1).\Delta\theta_R+(m/q).\Delta\theta_R]k.\Delta\theta_R=2\pi, \text{ where:}$$

$N_M$ is the number of individual machines on the circumference of the stator;

q is the number of phases of each individual machine;

Nc is the number of excitation means per phase of each individual machine;

m is a positive or negative integer representing the value of the phase difference between two individual machines and is in the range $-(q-1)$ to $+(q-1)$;

$\Delta\theta_R$ is the constant angular gap between two adjacent rotor teeth, or rotor pitch;

$\Delta\theta_S$ is the constant angular gap between two adjacent runs of stator coils, or stator pitch; and k is an integer.

13. A machine according to claim 12 wherein each individual cell has a stator structure defining a pair of spaced notches for two respective portions of a stator coil, said notches being delimited laterally by two stator teeth, said machine further comprising excitation means adapted to establish in one or other of the stator teeth within said stator coil a magnetic field varying in accordance with the mutual angular position of the rotor teeth and the stator teeth.

14. A machine according to claim 13 wherein the individual cells are separated from each other by gaps.

15. A machine according to claim 13 wherein the individual cells are separated from each other by decoupling permanent magnets having a field orientation opposite to that of the excitation means.

16. A machine according to claim 12 wherein the excitation means of each cell includes a permanent magnet disposed between two stator elements having a generally U-shaped profile defining said notches and said stator teeth.

17. A machine according to claim 16 wherein the excitation means of each cell includes an excitation coil disposed in two notches of a single stator element, one of which notches is substantially half-way between two stator coil notches also formed in said stator element.

18. A machine according to claim 17 which comprises pairs of cells formed in a common structural element housing two stator coils corresponding to two different phases, a magnet for exciting one of the stator coils and an excitation coil for exciting the other stator coil.

19. A machine according to claim 12 wherein the excitation means of each cell includes an excitation coil disposed in two notches of a single stator element, one of which notches is substantially half-way between two stator coil notches also formed in said stator element.

20. A machine according to claim 19 wherein a portion of the excitation coil is disposed in a notch in the inside surface and a portion of the excitation coil is disposed in a notch in the outside surface of the stator element to generate an essentially tangential magnetic field at said coil.

21. A machine according to claim 19 wherein the excitation coil is disposed in two notches both in the inside surface of the stator element to generate an essentially radial magnetic field at said coil.

22. A machine according to claim 12 wherein the excitation coils are connected in parallel to a common source of current (EXC).

23. A machine according to claim 12 wherein stator coils are angularly equidistant over all of the inside circumference of the stator, the angular gap between the various cells being substantially equal to the angular dimension of a notch receiving a portion of a stator coil.

24. A machine according to any one of claim 12 wherein portions of the stator coils housed in notches in the same cell or the same group of cells are separated by a constant angular gap ($\Delta\theta_S$) and the angular gap between portions of successive stator coils in two separate cells or groups of cells is different from said constant angular gap.

25. A machine according to claim 24 wherein said constant angular gap ($\Delta\theta_S$) is identical to the angular gap ($\Delta\theta_R$) between two adjacent rotor teeth.

26. A machine according to claim 12 wherein the rotor pitch and the stator pitch satisfy the following condition:

$$(7/8).\Delta\theta_S \leq \Delta\theta_R \leq (5/4).\Delta\theta_S.$$

27. A machine according to claim 26 wherein the stator pitch is equal to the rotor pitch and the geometry of the rotor and stator structures of the machine satisfies the following condition:

$$N_M.q.(N_c+1)+N_N.m=k.$$

28. A machine according to claim 12 comprising a single individual machine with three regularly distributed individual cells respectively accommodating the stator coils of three phases and wherein the rotor includes a plurality of rotor teeth equal to 4, 5, 7 or 8.

29. A machine according to claim 12 comprising two individual machines each with three regularly distributed individual cells respectively accommodating the stator coils of three phases and wherein the rotor includes a number of rotor teeth equal to 8, 10, 14 or 16.

30. A machine according to claim 12 which comprises a single stator frame including at least two series of internal notches adapted to accommodate respectively the stator coils and the excitation magnets or the excitation coils.

31. A machine according to claim 12 which comprises a polyphase motor.

* * * * *